United States Patent
Honjo (10) Patent No.: US 8,214,160 B2
(45) Date of Patent: Jul. 3, 2012

(54) STATE DETECTION DEVICE, STATE DETECTION METHOD, STATE DETECTION PROGRAM, AND INFORMATION RECORDING MEDIUM

(75) Inventor: Yoshiyuki Honjo, Tokyo (JP)

(73) Assignee: THK. Co., Ltd., Tokyo (JP)

( * ) Notice: Subject to any disclaimer, the term of this patent is extended or adjusted under 35 U.S.C. 154(b) by 153 days.

(21) Appl. No.: 12/280,891

(22) PCT Filed: Jan. 31, 2007

(86) PCT No.: PCT/JP2007/051547
§ 371 (c)(1),
(2), (4) Date: Oct. 30, 2008

(87) PCT Pub. No.: WO2007/099730
PCT Pub. Date: Sep. 7, 2007

(65) Prior Publication Data
US 2009/0205425 A1      Aug. 20, 2009

(30) Foreign Application Priority Data
Feb. 28, 2006   (JP) .............................. P2006-054134

(51) Int. Cl.
*G01B 3/44*      (2006.01)
(52) U.S. Cl. ................. 702/34; 702/33; 702/35; 702/57; 702/64; 702/66; 702/67; 702/69; 702/70; 702/73; 702/76; 702/189; 702/191; 702/193; 702/195; 73/593
(58) Field of Classification Search ....................... 73/34
See application file for complete search history.

(56) References Cited

U.S. PATENT DOCUMENTS
2002/0169569 A1   11/2002   Miller
2006/0167659 A1*   7/2006   Miyasaka et al. ............. 702/185

FOREIGN PATENT DOCUMENTS
| EP | 1 548 419 | 6/2005 |
|---|---|---|
| EP | 1 598 569 | 11/2005 |
| JP | 05-281094 | 10/1993 |
| JP | 2001-255241 | 9/2001 |
| JP | 2003-130724 | 5/2003 |
| JP | 2004-93357 | 3/2004 |
| JP | 2005-017128 | 1/2005 |
| SU | 864040 B * | 9/1981 |

OTHER PUBLICATIONS

Takejyu Shirai et al., AE sensor o Michiita Chokudo Annai Sochi no Unten Jotai Hyoaka, (English translated version).* Kondo, JP405052643, Abstract only (English translated).*
Chumak, et al., Su 864040, Abstract only (English translated).*
Takeo Yoshioka, et al., "AE Sensor o Mochiita Chokudo Annai Sochi no Unten Jotai Hyoaka" Japanese Society of Tribologists, Tokyo, May 2004, Apr. 16, 2004, pp. 143 to 144.

* cited by examiner

Primary Examiner — Jonathan C Teixeira Moffat
Assistant Examiner — Hyun Park
(74) Attorney, Agent, or Firm — Young & Thompson (57) ABSTRACT

A state detecting apparatus S for detecting a current operating state of an LM (linear motion) system includes an AE sensor 1 generating a detection signal Sae by detecting an AE wave elastically generated when a plurality of balls contained in the LM system revolve in a circulation portion while spinning themselves; and a signal processing unit 4 generating a parameter indicating an intensity of the AE wave based on only the detection signal Sae corresponding to an operating frequency of the ball, and uses the parameter to determine a lubrication state of the LM system. Thereby, it is possible to provide the state detecting apparatus capable of predicting failure occurrence in the LM system; providing an improved maintenance to a user of the LM system and further longer lifetime thereof; and providing a performance guarantee and an improved quality of a device or equipment manufactured using the LM system.

12 Claims, 7 Drawing Sheets

STATE DETECTION DEVICE, STATE DETECTION METHOD, STATE DETECTION PROGRAM, AND INFORMATION RECORDING MEDIUM

TECHNICAL FIELD

The present invention relates to a technical field of a state detecting apparatus and a state detecting method; and a state detecting program and an information recording medium, and more particularly to a technical field of a state detecting apparatus and a state detecting method for detecting an operating state of a linear motion rolling guide unit during the operation of the linear motion rolling guide unit; a state detecting program for detecting the operating state; and an information recording medium on which the state detecting program is computer-readably recorded.

BACKGROUND ART

Conventionally, so called a linear motion rolling guide unit has been widely used which includes a rail, a movable block moving in a longitudinal direction on the rail, and a plurality of balls (rolling body) which are provided between the rail and the movable block, are circulating (revolving) while rotating (spinning) themselves to move the movable block with a high accuracy. Specifically, the linear motion rolling guide unit has been used in a member for supporting a three-dimensional motion of a work table of a machine tool or a pendulum motion of a pendulum railcar, and further in a seismic isolation structure of a building. It should be noted that the linear motion rolling guide unit includes not only the above described unit consisting of a movable block and a rail but also a so called ball screw.

With such a wide spread of the linear motion rolling guide unit, there is an increasing demand for failure prevention of the linear motion rolling guide unit, and what is needed is a diagnostic method for an operating state thereof with a high accuracy.

Here, as a method for diagnosing an operating state of a conventional general machine system (e.g., a rotational roller bearing unit including a ball bearing) excluding the linear motion rolling guide unit, for example, as shown in Patent Document 1 below, there is provided a vibration detecting method for diagnosing the operating state by monitoring a vibration generation state in the machine system; an oil evaluating method for diagnosing the operating state by extracting lubricating oil used in the machine system and evaluating the quality thereof; an electrical resistance method for diagnosing the operating state by measuring an electrical resistance between the members driven by way of lubricating oil in the machine system or a temperature measuring method for diagnosing the operating state by measuring, using a thermocouple or the like, the temperature of a member driven by way of lubricating oil in the machine system.

Patent Document 1: Japanese Patent Laid-Open No. 2004-93357

DISCLOSURE OF THE INVENTION

Problems to be Solved by the Invention

However, when these diagnostic methods are applied to the linear motion rolling guide unit, following cases occur.

The vibration detection method has a case in that balls serving as a rolling body in the linear motion rolling guide unit are spinning by themselves and revolving in a circulation portion thereof and thus there are many vibration generation sources; and accordingly, a vibration attributable to an abnormality of the above described operating state to be detected cannot be detected accurately.

The oil evaluation method also has a case in that there is a need to extract, from the linear motion rolling guide unit itself, and inspect a lubricating oil before use and a lubricating oil after use in the linear motion rolling guide unit to be diagnosed respectively and therefore, it takes extra time to obtain the diagnostic result; and there is also a need to temporarily stop the linear motion rolling guide unit itself to extract a lubricating oil and thus it reduces operating efficiency thereof.

The electrical resistance method and the temperature measuring method also have a case in that both methods are susceptible to electrical noise and it is often difficult to measure when the above described movable block is moving slow.

Therefore, conventionally, it is difficult to diagnose the operating state of the linear motion rolling guide unit accurately in actual time (i.e., in real time).

In view of the above described cases, the present invention has been made, and an object of the present invention is to provide a state detecting apparatus and a state detecting method therefor; a state detecting program for detecting the operating state; and an information recording medium on which the state detecting program is computer-readably recorded, capable of predicting failure occurrence in a linear motion rolling guide unit by accurately detecting the operating state of the linear motion rolling guide unit in real time; and also capable of providing an improved maintenance to a user of the linear motion rolling guide unit and further longer lifetime thereof; and providing a performance guarantee and an improved quality of a device or equipment in which the linear motion rolling guide unit is incorporated.

Means for Solving the Problems

In order to solve the above cases, the invention according to claim 1 is a state detecting apparatus for detecting a current operating state of a linear motion rolling guide unit, comprising: a detection unit such as an AE (acoustic emission) sensor for detecting a wave motion which is elastically generated due to at least one of collision which occurs between a rolling surface contained in the linear motion rolling guide unit and a rolling body when a plurality of rolling bodies contained in the linear motion rolling guide unit are revolving in a circulation portion while spinning themselves; slip at a contact portion between the rolling surface and the rolling body; collision between the rolling bodies themselves, slip in a contact portion of the rolling bodies themselves; and crack which occurs in at least one of the rolling body and the rolling surface; and for generating an electrical detection signal corresponding to the detected wave motion; an extraction device such as a signal processing unit for extracting only a measured value attributable to an operation of the linear motion rolling guide unit from measured values obtained by sampling the generated detection signal; a generation device such as a signal processing unit for generating a parameter indicating an intensity of the wave motion based on the extracted measured value; and a determination device such as a signal processing unit for comparing a value of the generated parameter and a threshold predetermined for the parameter and determining whether the operating state is normal or not.

Accordingly, a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

In order to solve the above cases, the invention according to claim 2 is configured such that, in the state detecting apparatus according to claim 1, the extraction device is provided with a transform device such as a signal processing unit for performing Fourier transform on the individual measured value obtained by the sampling, and generating a transformed measured value respectively; and extracts only the transformed measured value corresponding to a frequency corresponding to an operating frequency of the linear motion rolling guide unit from the generated transformed measured values and outputs the value to the generation device.

Accordingly, only the value corresponding to an operating frequency of the linear motion rolling guide unit is extracted from the transformed measured values after Fourier transform so as to be outputted to the generation device; and thereby, a required transformed measured value can be extracted by a simple configuration.

In order to solve the above cases, the invention according to claim 3 is configured such that, in the state detecting apparatus according to claim 1, the extraction device is provided with a transform device such as a signal processing unit for performing Fourier transform on the individual measured value obtained by the sampling, and generating a transformed measured value respectively; and outputs, to the generation device, the transformed measured value which is left by removing the transformed measured value corresponding to a frequency width equal to or greater than a frequency which is higher by a predetermined frequency width than an operating frequency of the linear motion rolling guide unit from the generated transformed measured values.

Accordingly, the transformed measured value which is left by removing the transformed measured value corresponding to a frequency width equal to or greater than a frequency which is higher by a predetermined frequency width than an operating frequency of the linear motion rolling guide unit from the transformed measured values after Fourier transform is outputted to the generation device; and thereby, a required transformed measured value can be extracted by a simpler configuration.

In order to solve the above cases, the invention according to claim 4 is configured such that, in the state detecting apparatus according to claim 1, the extraction device is provided with a transform device such as a signal processing unit for performing Fourier transform on the individual measured value obtained by the sampling, and generating a transformed measured value respectively; and outputs, to the generation device, the transformed measured value which is left by removing the transformed measured value corresponding to a frequency width equal to or less than a frequency which is lower by a predetermined frequency width than an operating frequency of the linear motion rolling guide unit from the generated transformed measured values.

Accordingly, the transformed measured value which is left by removing the transformed measured value corresponding to a frequency width equal to or less than a frequency which is lower by a predetermined frequency width than an operating frequency of the linear motion rolling guide unit from the transformed measured values after Fourier transform is outputted to the generation device; and thereby, a required transformed measured value can be extracted by a simpler configuration.

In order to solve the above cases, the invention according to claim 5 is configured such that, in the state detecting apparatus according to any one of claims 1 to 4, the determination device determines that the operating state is a good lubrication state if a value of the generated parameter is less than the threshold.

Accordingly, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

In order to solve the above cases, the invention according to claim 6 is a state detecting method for detecting a current operating state of a linear motion rolling guide unit, comprising: a detection step for detecting a wave motion which is elastically generated due to at least any one of collision which occurs between a rolling surface contained in the linear motion rolling guide unit and a rolling body when a plurality of rolling bodies contained in the linear motion rolling guide unit are revolving in a circulation portion while spinning themselves; slip in a contact portion between the rolling surface and the rolling body; collision between the rolling bodies themselves, slip in a contact portion of the rolling bodies themselves; and crack which occurs in at least one of the rolling body and the rolling surface; and for generating an electrical detection signal corresponding to the detected wave motion; an extraction step for extracting only a measured value attributable to an operation of the linear motion rolling guide unit from measured values obtained by sampling the generated detection signal; a generation step for generating a parameter indicating an intensity of the wave motion based on the extracted measured value; and a determination step for comparing a value of the generated parameter and a threshold predetermined for the parameter and determining whether the operating state is normal or not.

Accordingly, a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

In order to solve the above cases, the invention according to claim 7 is configured such that, in the state detecting method according to claim 6, the determination step determines that the operating state is a good lubrication state if a value of the generated parameter is less than the threshold.

Accordingly, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

In order to solve the above cases, the invention according to claim 8 causes a computer to function as the state detecting apparatus according to any one of claims 1 to 5.

Accordingly, if a computer is caused to function as the state detecting apparatus according to claim 1, the computer is caused to function such that a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

Further, if a computer is caused to function as the state detecting apparatus according to claim 2, in addition to the case where the computer is caused to function as the state detecting apparatus according to claim 1, the computer is caused to function such that only the value corresponding to an operating frequency of the linear motion rolling guide unit is extracted from the transformed measured values after Fourier transform; and thereby, a required transformed measured value can be extracted by a simple configuration.

Further, if the computer is caused to function as the state detecting apparatus according to claim 3, in addition to the case where the computer is caused to function as the state detecting apparatus according to claim 1, the computer is caused to function such that the transformed measured value which is left by removing the transformed measured value corresponding to a frequency width equal to or greater than a frequency which is higher by a predetermined frequency width than an operating frequency of the linear motion rolling guide unit from the transformed measured values after Fourier transform is generated; and thereby a required transformed measured value can be extracted by a simpler configuration.

Furthermore, if the computer is caused to function as the state detecting apparatus according to claim 4, in addition to the case where the computer is caused to function as the state detecting apparatus according to claim 1, the computer is caused to function such that the transformed measured value which is left by removing the transformed measured value corresponding to a frequency width equal to or less than a frequency which is lower by a predetermined frequency width than an operating frequency of the linear motion rolling guide unit from the transformed measured values after Fourier transform is generated; and thereby a required transformed measured value can be extracted by a simpler configuration.

Further, if the computer is caused to function as the state detecting apparatus according to claim 5, in addition to the case where the computer is caused to function as the state detecting apparatus according to any one of claims 1 to 4, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

In order to solve the above cases, the state detecting program according to claim 8 is computer-readably recorded by the computer on the invention according to claim 9.

Accordingly, if the computer is caused to function as the state detecting apparatus according to claim 1 by causing the computer to read and execute the state detecting program, the computer is caused to function such that a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

Further, if the computer is caused to function as the state detecting apparatus according to claim 2 by causing the computer to read and execute the state detecting program, in addition to the case where the computer is caused to function as the state detecting apparatus according to claim 1, the computer is caused to function such that only the value corresponding to an operating frequency of the linear motion rolling guide unit is extracted from the transformed measured values after Fourier transform; and thereby, a required transformed measured value can be extracted by a simple configuration.

Further, if the computer is caused to function as the state detecting apparatus according to claim 3 by causing the computer to read and execute the state detecting program, in addition to the case where the computer is caused to function as the state detecting apparatus according to claim 1, the computer is caused to function such that the transformed measured value which is left by removing the transformed measured value corresponding to a frequency width equal to or greater than a frequency which is higher by a predetermined frequency width than an operating frequency of the linear motion rolling guide unit from the transformed measured values after Fourier transform is generated; and thereby a required transformed measured value can be extracted by a simpler configuration.

Furthermore, if the computer is caused to function as the state detecting apparatus according to claim 4 by causing the computer to read and execute the state detecting program, in addition to the case where the computer is caused to function as the state detecting apparatus according to claim 1, the computer is caused to function such that the transformed measured value which is left by removing the transformed measured value corresponding to a frequency width equal to or less than a frequency which is lower by a predetermined frequency width than an operating frequency of the linear motion rolling guide unit from the transformed measured values after Fourier transform is generated; and thereby a required transformed measured value can be extracted by a simpler configuration.

Further, if the computer is caused to function as the state detecting apparatus according to claim 5 by causing the computer to read and execute the state detecting program, in addition to the case where the computer is caused to function as the state detecting apparatus according to any one of claims 1 to 4, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

Effects of the Invention

According to the invention of claim 1, a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

Accordingly, it is possible to predict failure occurrence in the linear motion rolling guide unit; to provide an improved maintenance to a user of the linear motion rolling guide unit; to provide longer lifetime thereof; and to provide an improved quality of a device or equipment manufactured using the linear motion rolling guide unit.

According to the invention of claim 2, in addition to the advantage of the invention of claim 1, only the value corresponding to an operating frequency of the linear motion rolling guide unit is extracted from the transformed measured values after Fourier transform so as to be outputted to the generation device; and thereby a required transformed measured value can be extracted by a simple configuration.

According to the invention of claim 3, in addition to the advantage of the invention of claim 1, the transformed measured value which is left by removing the transformed measured value corresponding to a frequency width equal to or greater than a frequency which is higher by a predetermined frequency width than an operating frequency of the linear motion rolling guide unit from the transformed measured values after Fourier transform is outputted to the generation device; and thereby a required transformed measured value can be extracted by a simpler configuration.

According to the invention of claim 4, in addition to the advantage of the invention of claim 1, the transformed measured value which is left by removing the transformed measured value corresponding to a frequency width equal to or less than a frequency which is lower by a predetermined frequency width than an operating frequency of the linear motion rolling guide unit from the transformed measured values after Fourier transform is outputted to the generation device; and thereby a required transformed measured value can be extracted by a simpler configuration.

According to the invention of claim 5, in addition to the advantage of the invention of any one of claims 1 to 4, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

According to the invention of claim 6, a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

Accordingly, it is possible to predict failure occurrence in the linear motion rolling guide unit; to provide an improved maintenance to a user of the linear motion rolling guide unit; to provide longer lifetime thereof; and to provide an improved quality of a device or equipment manufactured using the linear motion rolling guide unit.

According to the invention of claim 7, in addition to the advantage of the invention of claim 6, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

According to the invention of claim 8, if the computer is caused to function as the state detecting apparatus of claim 1, the computer is caused to function such that a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

Accordingly, it is possible to predict failure occurrence in the linear motion rolling guide unit; to provide an improved maintenance to a user of the linear motion rolling guide unit; to provide longer lifetime thereof; and to provide an improved quality of a device or equipment manufactured using the linear motion rolling guide unit.

Further, if the computer is caused to function as the state detecting apparatus according to claim 2, in addition to the advantage of the case where the computer is caused to function as the state detecting apparatus according to claim 1, the computer is caused to function such that only the value corresponding to an operating frequency of the linear motion rolling guide unit is extracted from the transformed measured values after Fourier transform; and thereby, a required transformed measured value can be extracted by a simple configuration.

Further, if the computer is caused to function as the state detecting apparatus of claim 3, in addition to the advantage that the computer is caused to function as the state detecting apparatus according to claim 1, the computer is caused to function such that the transformed measured value which is left by removing the transformed measured value corresponding to a frequency width equal to or greater than a frequency which is higher by a predetermined frequency width than an operating frequency of the linear motion rolling guide unit from the transformed measured values after Fourier transform is generated; and thereby a required transformed measured value can be extracted by a simpler configuration.

Furthermore, if the computer is caused to function as the state detecting apparatus according to claim 4, in addition to the advantage that the computer is caused to function as the state detecting apparatus according to claim 1, the computer is caused to function such that the transformed measured value which is left by removing the transformed measured value corresponding to a frequency width equal to or less than a frequency which is lower by a predetermined frequency width than an operating frequency of the linear motion rolling guide unit from the transformed measured values after Fourier transform is generated; and thereby, a required transformed measured value can be extracted by a simpler configuration.

Further, if the computer is caused to function as the state detecting apparatus according to claim 5, in addition to the advantage that the computer is caused to function as the state detecting apparatus according to any one of claims 1 to 4, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

According to the invention of claim 9, if the computer is caused to function as the state detecting apparatus according to claim 1 by causing the computer to read and execute the state detecting program, the computer is caused to function such that a parameter indicating an intensity of the wave motion which is elastically generated by an operation of the linear motion rolling guide unit is generated; the value and the corresponding threshold are compared to determine whether the operating state in the linear motion rolling guide unit is normal or not; and thereby, it is possible to detect whether the operating state is normal or not, in real time, while the linear motion rolling guide unit is operating, without disassembling the linear motion rolling guide unit and without being affected by vibration caused by the operation or vibration caused by an external drive device and the like.

Accordingly, it is possible to predict failure occurrence in the linear motion rolling guide unit; to provide an improved maintenance to a user of the linear motion rolling guide unit; to provide longer lifetime thereof; and to provide an improved quality of a device or equipment manufactured using the linear motion rolling guide unit.

Further, if the computer is caused to function as the state detecting apparatus according to claim 2 by causing the computer to read and execute the state detecting program, in addition to the advantage of the case where the computer is caused to function as the state detecting apparatus according to claim 1, the computer is caused to function such that only the value corresponding to an operating frequency of the linear motion rolling guide unit is extracted from the transformed measured values after Fourier transform; and thereby, a required transformed measured value can be extracted by a simple configuration.

Furthermore, if the computer is caused to function as the state detecting apparatus according to claim 3 by causing the computer to read and execute the state detecting program, in addition to the advantage of the case where the computer is caused to function as the state detecting apparatus according to claim 1, the computer is caused to function such that the transformed measured value which is left by removing the transformed measured value corresponding to a frequency width equal to or greater than a frequency which is higher by a predetermined frequency width than an operating frequency of the linear motion rolling guide unit from the transformed measured values after Fourier transform is generated; and thereby, a required transformed measured value can be extracted by a simpler configuration.

Furthermore, if the computer is caused to function as the state detecting apparatus of claim 4 by causing the computer to read and execute the state detecting program, in addition to the advantage of the case where the computer is caused to function as the state detecting apparatus according to claim 1, the computer is caused to function such that the transformed measured value which is left by removing the transformed measured value corresponding to a frequency width equal to or less than a frequency which is lower by a predetermined frequency width than an operating frequency of the linear motion rolling guide unit from the transformed measured values after Fourier transform is generated; and thereby a required transformed measured value can be extracted by a simpler configuration.

Furthermore, if the computer is caused to function as the state detecting apparatus according to claim 5 by causing the computer to read and execute the state detecting program, in addition to the advantage of the case where the computer is caused to function as the state detecting apparatus according to any one of claims 1 to 4, if a value of the parameter is less than the threshold, the operating state of the linear motion rolling guide unit is determined as a good lubrication state; and thereby, it is possible to detect whether the operating state is a good lubrication state or not, in real time, while the linear motion rolling guide unit is operating, without disassembling the linear motion rolling guide unit and without being affected by vibration caused by the operation or vibration caused by external drive device and the like.

REFERENCE NUMERALS

1 AE sensor, 2 Waveform shaping unit, 2A BPF, 2B Envelope detection unit, 3 A/D converter, 4 Signal processing unit, 5 Display unit, 10 Contact portion, 11 Casing, 12, 14 Deposited silver film, 13 Piezoelectric element, 15 External line, 20 LM rail, 21, C Movable block, 22, 43, B ball, S State diagnosing device, G Rolling surface, TR Retainer, Sae Detection signal, Sw Envelope signal, Sdw Digital envelope signal, Sdp Determination signal

BEST MODE FOR CARRYING OUT THE INVENTION

Next, preferred embodiments of the present invention will be described with reference to the drawings.

It should be noted that the embodiments described below are the embodiments to which the present invention is applied for detection and diagnosis of an operating state of the linear motion rolling guide unit (hereinafter referred to as an LM system including a so called linear motion system such as a LM guide, a ball spline, and the like).

(I) Principle of the Present Invention

Before the embodiments of the present invention are described in detail, the principle of the present invention will be described with reference to FIGS. 1 and 2.

When the present inventors study a method for diagnosing the operating state of the above described LM system, the present inventors have found that a so called AE phenomenon conventionally used for a failure diagnosis or the like for a rotational roller bearing unit can be applied to the diagnosis of the operating state of the LM system.

More specifically, the present inventors have experimentally confirmed that a different aspect of the AE phenomenon occurs depending on each of the various abnormal operating states (Specifically, hereinafter, the abnormal operating state refers to a poor lubrication state, either a state in which a crack (hereinafter, both a surface crack and an internal crack are included) occurs, causing flaking to occur, or a state in which a liquid other than a lubricant agent is mixed in a lubricant agent, causing a lubrication failure) occurring in an LM system; and when an individually different abnormal operating state occurs, mutually different AE waves occur accordingly.

Here, "poor lubrication state" refers to a state a lubricant agent itself is in short supply or a state in which the characteristics of the lubricant agent are deteriorated. "The flaking" refers to a peeling phenomenon occurring on the surface of a ball serving as a rolling body included in the LM system or the surface of a guide serving as a rolling surface with which the ball is in contact. "The liquid other than a lubricant agent" refers to, for example, a cooling liquid (coolant) used in a cutting device using the LM system in accordance with the present invention.

Here, conventionally, the AE phenomenon is defined as "a phenomenon in which an elastic energy is released following a destruction or modification of a solid material, and an acoustic wave (AE wave) is generated", or "a phenomenon in which an elastic wave is generated following an occurrence of a plastic deformation, a crack, or the like inside the material".

In addition thereto, the present inventors have confirmed that an AE wave occurs due to not only the above described conditions but also a condition in which neither a plastic deformation nor a crack occurs on the ball surface or the guide surface, but a crack occurs inside the ball or the guide; and in addition, an AE wave occurs due to only mutual collision of the balls, which occurs by a normal operation of the LM system.

Figure 1:
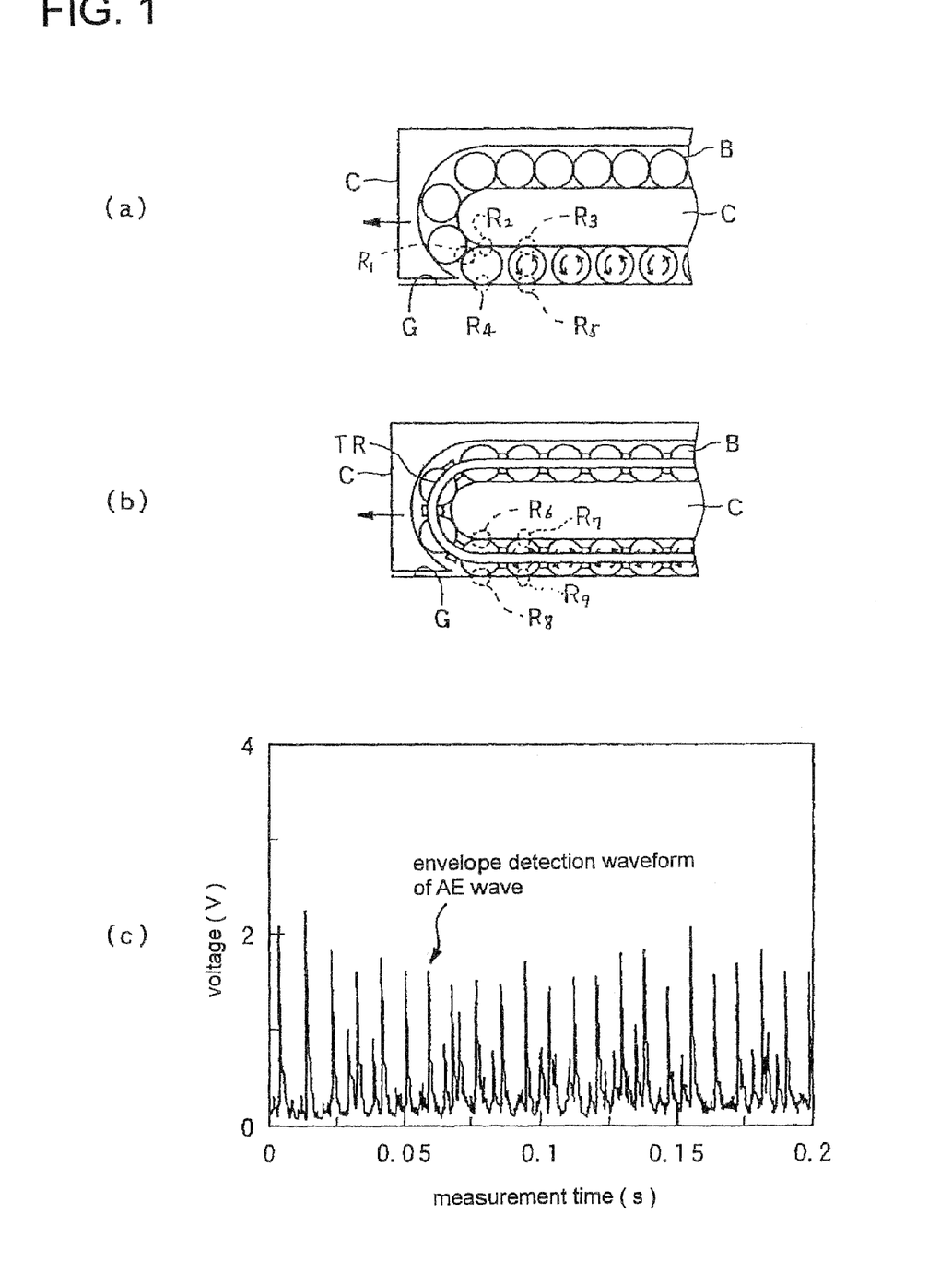
FIG. 1 explains the principle of the present invention, in which (a) and (b) illustrate generation of an extended AE wave in accordance with an embodiment of the present invention, and (c) illustrates an example of an envelope detection waveform corresponding to the extended AE wave.

More specifically, in the LM system using a movable block, as shown in FIG. 1(a), it has been confirmed that, in the case where a ball B is revolving while spinning within a rolling passage formed inside a movable block C, an AE wave occurs: when the balls B collide with each other at a contact portion R1; when a collision or a slip occurs at a contact portion R2 between the ball B in unloaded condition and the movable block C; when the ball B in loaded condition and the movable block C are in contact with each other at a contact portion R3; when a contact or a slip occurs at a contact portion R4 between the ball B in unloaded condition and the rolling surface G; or when the ball B in loaded condition and the rolling surface G are in contact with each other at a contact portion R5.

In addition, in the LM system using a movable block, as shown in FIG. 1(b), it has been confirmed that, even if not only a ball B but also a retainer TR is provided in the rolling passage, in the case where the ball B is revolving while spinning within the rolling passage inside the movable block C, an AE wave occurs: when the ball B in unloaded condition and the movable block C collide with each other at a contact portion R6; when the ball B in loaded condition and the movable block C are in contact with each other at a contact portion R7; when the ball B in unloaded condition and the rolling surface G collide with each other at a contact portion R8; or when the ball B in loaded condition and the rolling surface G are in contact with each other at a contact portion R9.

Then, the present inventors have found that these AE wave generation aspects are mutually different from each other depending on the type of the above described abnormal operating states. More specifically, for example, regarding the relation between the above described "the poor lubrication state" and the AE wave, it has been confirmed that the poorer the lubrication state, the stronger AE wave occurs.

It should be noted that, as described above, the present invention assumes an occurrence of an AE phenomenon wider than the AE phenomenon based on the conventional definition, and thus, the AE phenomenon applied to the present invention is hereinafter referred to as an extended AE phenomenon; and the AE wave generated by the extended AE phenomenon is hereinafter referred to as an extended AE wave.

At this time, an electrical signal corresponding to the extended AE wave has a higher frequency than that of a vibration which generally occurs when the LM system is operating. Therefore, for example, as shown in FIG. 1(c), the extended AE wave can be detected separately from the vibration by a band-pass filter shown in FIG. 2 described later, thereby allowing the operating state to be detected in real time while the LM system is operating.

Further, the present inventors have attempted to use the extended AE wave in accordance with the present invention to automatically detect "the poor lubrication state", indicating the most frequently occurring abnormal operating state of the above described various abnormal operating states.

More specifically, first, the above electrical signal is sampled to obtain measured data. Then, n number of pieces of measured data corresponding to a certain measurement period are combined into one measured data group. Then, a Fourier transform (conversion to the frequency domain) is performed on individual measured data contained in each measured data group. Further, only the measured data corresponding to the operating frequency (more specifically, a passing frequency of the ball B with respect to one point on the guide surface exemplified in FIG. 1(a)) of the LM system to be inspected is extracted from the individual measured data after Fourier transform. Then, the extracted measured data is added to data corresponding to a high-frequency component corresponding to the measured data. Then, the added value is used as a parameter value in accordance with the present invention to compare the parameter value with a threshold TH experimentally obtained in advance. As a result, if the parameter value is smaller than the threshold TH, which indicates that a small extended AE wave occurs, the lubrication state in the LM system to be inspected is determined to be good.

(II) Embodiment

Next, an embodiment of the present invention based on the above described principle will be described in detail with reference to FIGS. 2 to 8(a).

Figure 2:
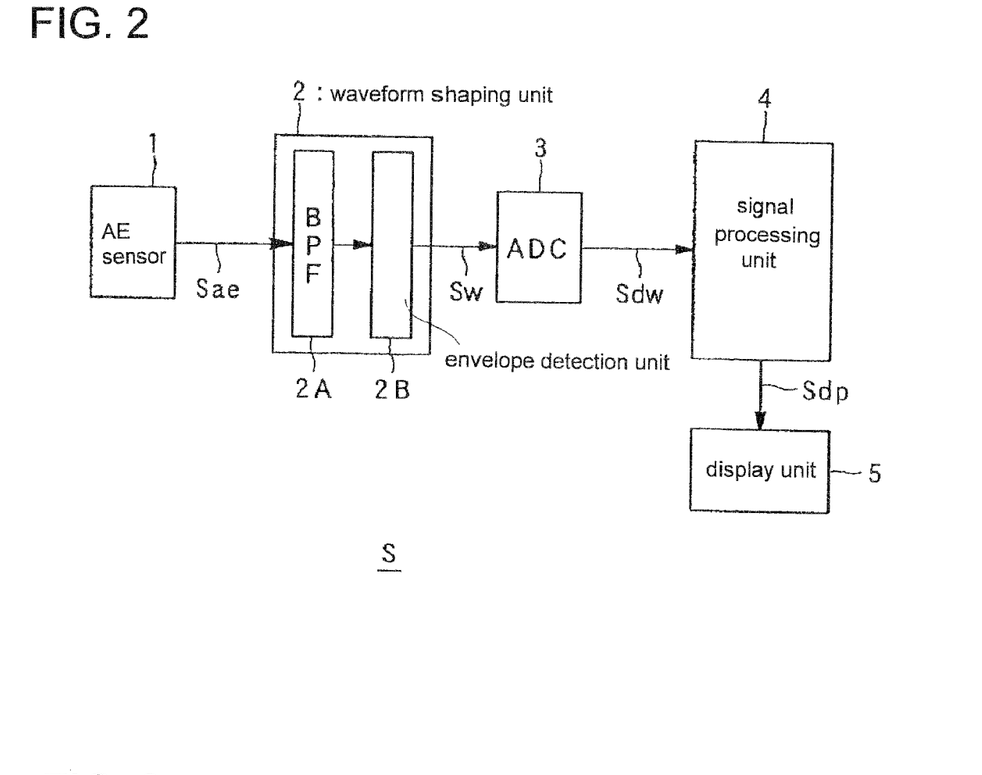
FIG. 2 is a block diagram illustrating a configuration of the state detecting apparatus in accordance with the embodiment of the present invention.
Figure 3:
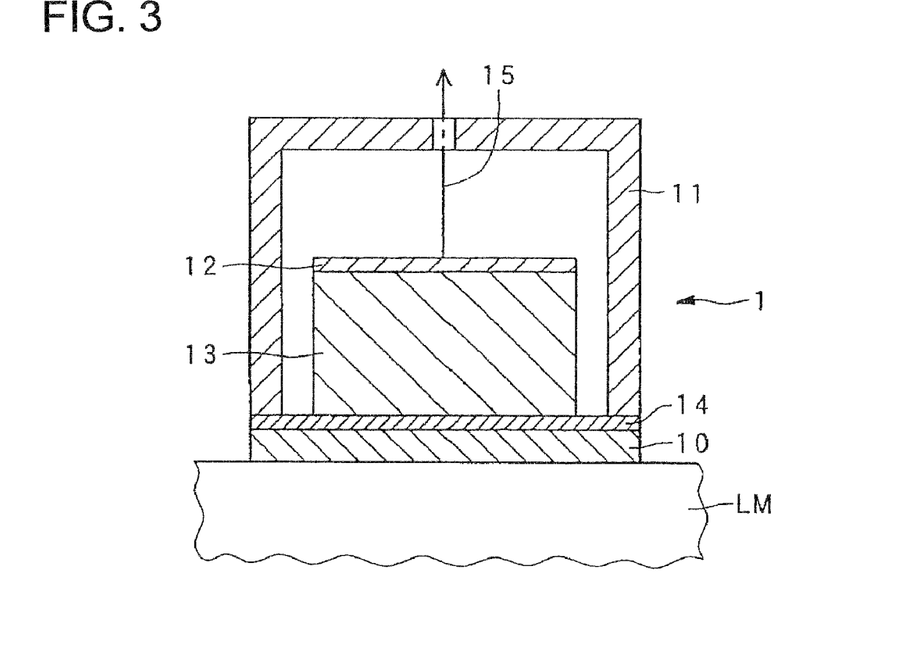
FIG. 3 is a longitudinal sectional view illustrating a configuration of an AE sensor in accordance with the embodiment of the present invention.
Figure 4:
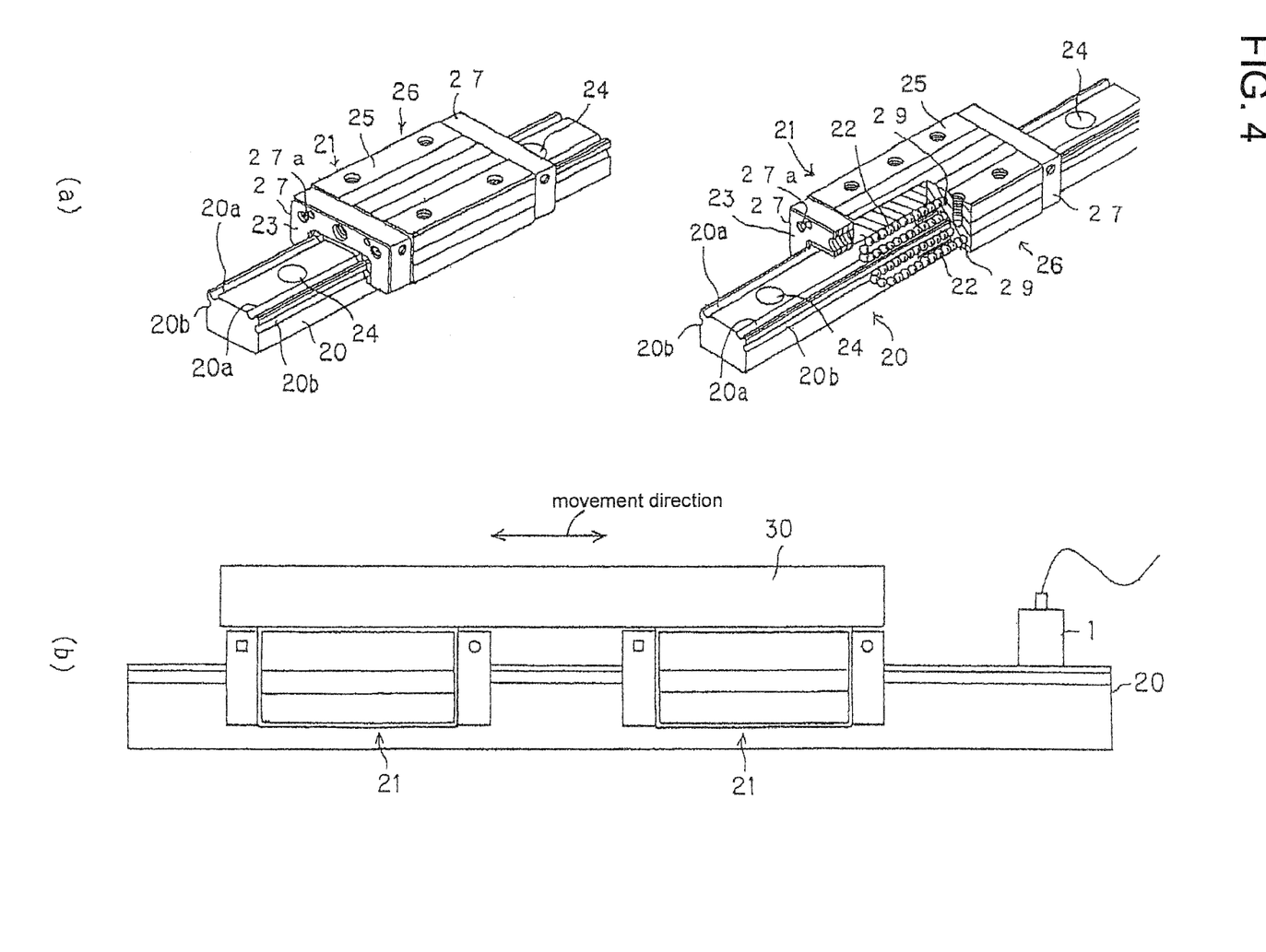
FIG. 4 illustrates an embodiment (I) of installing the AE sensor in accordance with the embodiment of the present invention, in which (a) is a perspective view of a structure of an LM sensor including a movable block; and (b) is an external side view illustrating an example of the position in which the AE sensor is installed on the LM sensor.
Figure 5:
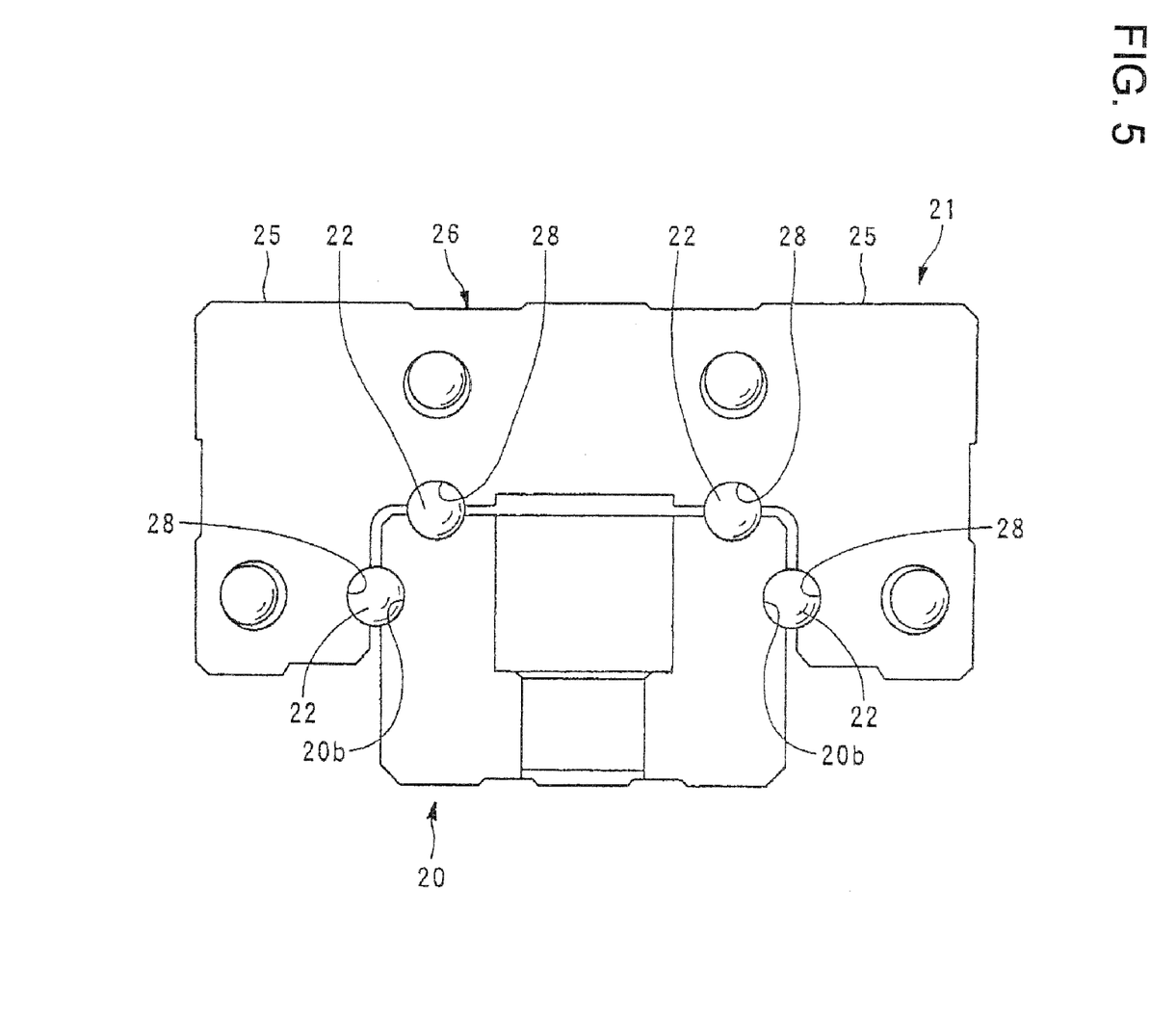
FIG. 5 is a side view of the LM system including a movable block in accordance with the embodiment of the present invention.
Figure 6:
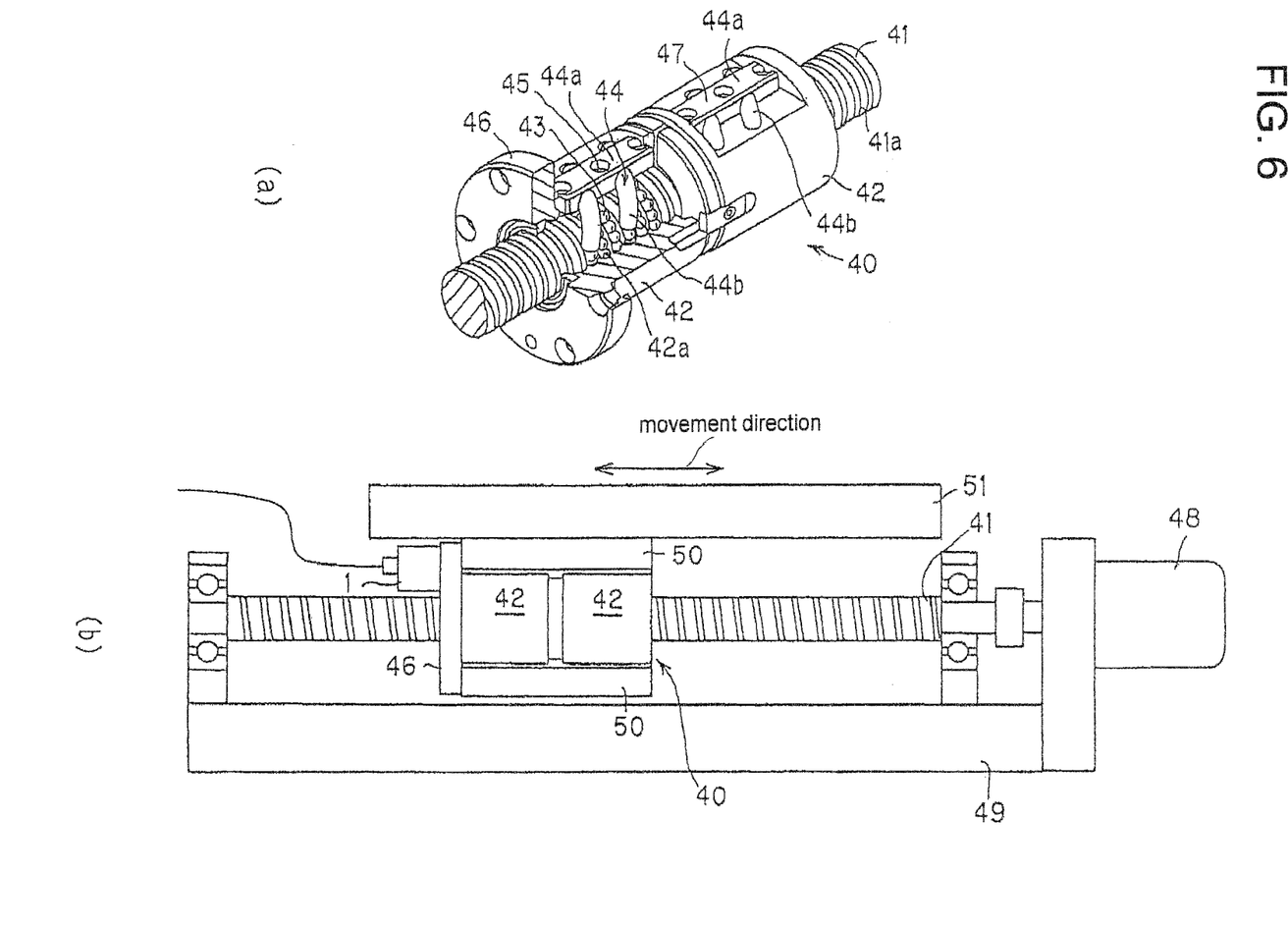
FIG. 6 illustrates an embodiment (II) of installing the AE sensor in accordance with the embodiment of the present invention, in which (a) is a perspective view of a structure of an LM system including a ball screw; and (b) is an external side view illustrating an example of the position in which the AE sensor is installed on the LM system.
Figure 7:
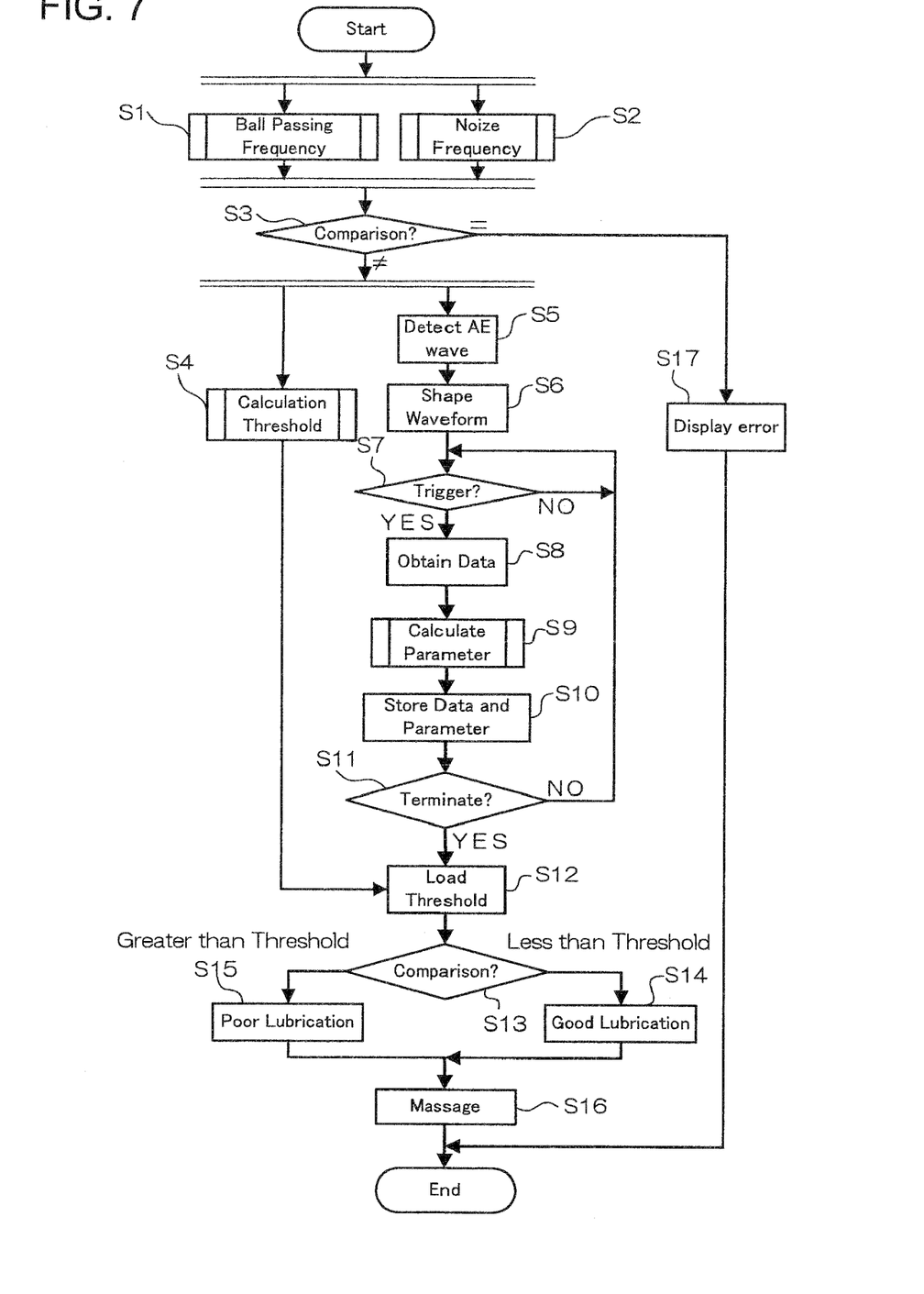
FIG. 7 is a flowchart showing the entire operating state detection process in accordance with the embodiment.
Figure 8:
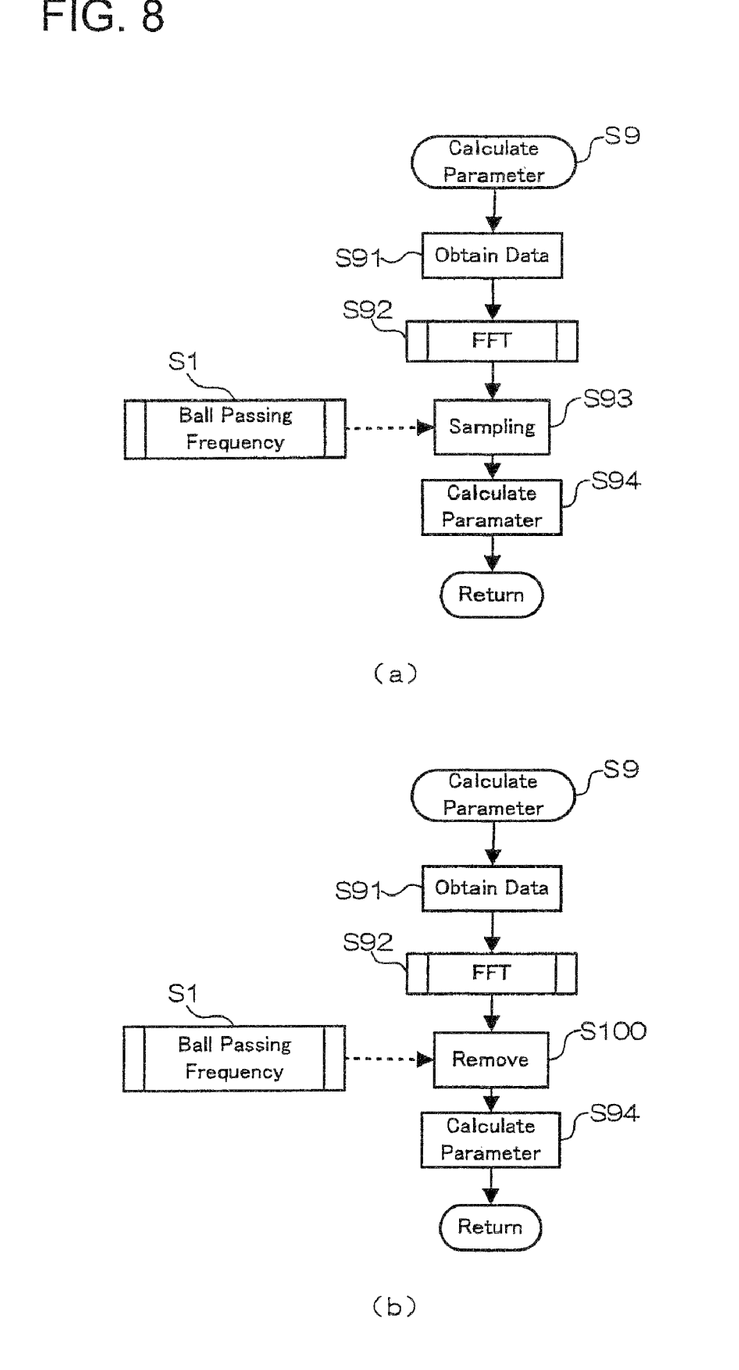
FIG. 8 is a flowchart showing the detailed operating state detection process in accordance with an embodiment and a variation of the present invention, in which (a) is a flowchart showing the parameter calculation process in accordance with the embodiment of the present invention; and (b) is a flowchart showing the parameter calculation process in accordance with the variation of the present invention.

FIG. 2 is a block diagram illustrating a schematic configuration of the state diagnosing apparatus in accordance with the embodiment of the present invention. FIG. 3 is a longitudinal sectional view illustrating a schematic configuration of an AE sensor for detecting an extended AE wave in accordance with the embodiment of the present invention. FIGS. 4 to 6 explain the LM system to which the present invention is applied. FIGS. 7 and 8(a) are flowcharts showing the operating state detection process performed by the state diagnosing apparatus in accordance with the embodiment of the present invention.

As shown in FIG. 2, the state diagnosing apparatus S in accordance with the embodiment of the present invention comprises an AE sensor 1 serving as detection device; a waveform shaping unit 2 including a band pass filter (BPF) 2A and an envelope detection unit 2B; an analog-to-digital (A/D) converter 3; a signal processing unit 4 serving as extraction device and determination device; a display unit 5 serving as notification device consisting of a liquid crystal display or the like.

Next, the operation will be described.

First, the AE sensor 1 is installed in an arbitrary place, for example, at the end of the rail or on the movable block serving as a movable member, of the LM system to be diagnosed in a manner such that the contact portion described later (FIG. 3) is arranged to be in contact with any of the above described place. The AE sensor 1 detects the above described extended AE wave which occurs due to the operation of the LM system; converts the wave into a detection signal Sae which is a voltage signal; and outputs the signal to the waveform shaping unit 2.

Next, the BPF 2A within the waveform shaping unit 2 removes the frequency component other than the extended AE wave from the detection signal Sae after being amplified by an amplification factor (specifically, for example, approximately 40 to 60 dB) required in an amplification unit (not shown) and outputs the resultant signal to the envelope detection unit 2B. Here, preferably, as the passing frequency band with respect to the detection signal Sae in the BPF 2A, for example, a BPF for passing a frequency component equal to or greater than 100 kHz to a frequency component equal to or less than 1 MHz is used as the BPF 2A.

Then, the envelope detection unit 2B extracts the envelope detection process to the detection signal Sae, generates an envelope signal Sw, and outputs the signal to the A/D converter 3.

Then, the A/D converter 3 converts the analog envelope signal Sw into a digital signal, generates a digital envelope signal Sdw, and outputs the signal to the signal processing unit 4.

Then, the signal processing unit 4 determines the current operating state of the LM system to be diagnosed by a later described operating state detection process shown in FIG. 8, based on the digital envelope signal Sdw; generates a determination signal Sdp indicating the result; and outputs the result to display unit 5.

Then, the display unit 5 displays a message indicating the content based on the determination signal Sdp. The displayed message allows a user of the LM system to understand the operating state thereof.

Next, with reference to FIGS. 3 to 6, detailed description will be given to the structure of the AE sensor 1 and an embodiment of installing the AE sensor 1 on the LM system to be diagnosed.

First, with reference to FIG. 3, the internal structure of the AE sensor 1 will be described.

As shown in FIG. 3, the AE sensor 1 has a cylindrical shape as a whole, and specifically, comprises a contact portion 10 arranged so as to be in contact with a rail LM in the LM system; a casing 11; a piezoelectric element 13; deposited silver films 12 and 14 formed on the upper and lower surfaces of the piezoelectric element 13; and an external line 15 through which the detection signal Sae is passed and outputted to the waveform shaping unit 2.

When an extended AE wave generated inside the LM system is transmitted through the contact portion 10 and the silver thin film 14 to the piezoelectric element 13, the extended AE wave causes the piezoelectric element 13 to be deformed a little in shape, which generates a difference in potential between the silver thin films 12 and 14. Then, the detection signal Sae appears on the external line 15.

Next, with reference to FIGS. 4 to 6, an embodiment of installing the AE sensor 1 having the internal structure shown in FIG. 3, to the LM system will be described. FIGS. 4 and 5 illustrate embodiments of installing the AE sensor 1 to the LM system using a movable block as the LM system to be diagnosed. FIG. 6 illustrates an embodiment of installing the AE sensor 1 to the LM system using a so-called ball screw as the LM system to be diagnosed.

First, with reference to FIGS. 4 and 5, the embodiment of installing the AE sensor 1 to the LM system using a movable block will be described.

The LM system shown in FIG. 4(a) comprises a rail 20 having ball rolling grooves 20a and 20b formed so as to roll a later described ball 22 in the longitudinal direction; a movable block 21 which is engaged with the rail 20 through above described many balls 22 and is provided with an endless circulation passage for circulating balls 22 therein; a seal member 23 which is attached to both the front and back edge faces in the moving direction of the movable block 21 and is tightly adhered to the upper surface and both the side surfaces of the rail 20. The LM system is configured such that the movable block 21 reciprocally moves on the rail 20 with a circulation of the balls 22.

As shown in these figures, the rail 20 is formed so as to be substantially rectangular in cross section and a mounting hole 24 for inserting a fixing bolt is penetratedly formed at appropriate intervals in the longitudinal direction. In addition, two rows of ball rolling grooves 20a are formed on the upper surface of the rail 20 so as to sandwich the mounting hole 24; two rows of ball rolling grooves 20b are formed on both the side surfaces thereof respectively; and the four rows of ball rolling grooves are formed so as to be in a deep groove shape having a little larger curvature than that of the spherical surface of the ball 22.

The movable block 21 comprises movable block main body 26 having a mounting surface 25 for mounting a movable body thereon such as a later described table 30 or the like; and a pair of end plates 27 and 27 fixed to both the front and back side surfaces of the movable block main body 26. The movable block 21 is formed so as to be substantially saddle-shaped in cross section with the bottom side having a recess allowing the upper portion of the track rail 20 to be loosely fit.

Then, as shown in FIG. 5, the movable block main body 26 comprises a base on which the mounting surface 25 is formed and a pair of skirt portions extending downward from both ends of the base and is formed so as to be substantially saddle-shaped in cross section. Four rows of loaded rolling grooves 28 are formed facing the ball rolling grooves 20a and 20b of the rail 20 respectively on the inside surface of the individual skirt portions and the lower side surface of the base. The balls 22 are rolling while being loaded between the loaded rolling grooves 28 and the ball rolling grooves 20a and 20b of the rail 20 so that the movable block 21 moves on the rail 20.

Now, go back to FIG. 4(a). Ball return holes 29 corresponding to the individual loaded rolling grooves 28 respectively are bored through the base of the movable block main body 26 and the individual skirt portions. These ball return holes 29 are communicably connected with the loaded rolling grooves 28 through a substantially U-shaped direction changing passage (not shown) formed on the end plates 27. Specifically, the direction changing passage is configured so as to scoop up the ball 22 which has completed rolling on the loaded rolling grooves 28 of the movable block main body 26; send the ball to the ball return hole 29; and at the same time, send the ball 22 from the ball return hole 29 to the loaded rolling grooves 28. Therefore, these end plates 27 are fixed to the movable block main body 26 using the mounting bolt 27a so as to form an endless circulation passage of the ball 22 in the movable block 21.

When the AE sensor 1 in accordance with the embodiment of the present invention is installed in the LM system shown in FIG. 4(a), as the exterior side view is shown in FIG. 4(b), for example, when the table 30 is installed on the plurality of movable blocks 21 which linearly moves on the track rail 20, the AE sensor 1 is installed in a position outside the moving range of the movable block 21 in the track rail 20.

Next, an embodiment of installing an AE sensor 1 to the LM system using a ball screw will be described with reference to FIG. 6.

As shown in FIG. 6(a), the ball screw 40 comprises a screw shaft 41 having a spiral ball rolling groove 41a on an outer peripheral surface thereof; a nut member 42 having a spiral loaded rolling groove 42a facing the ball rolling groove 41a on an inner peripheral surface thereof; balls 43 rolling between the ball rolling groove 41a and the loaded rolling groove 42a. A loaded rolling passage is formed by and between the ball rolling groove 41a of the screw shaft 41 and the loaded rolling groove 42a of the nut member 42. For example, two return pipes 44 are installed to the nut member 42 as the circulating parts. The return pipe 44 connects one end of the loaded rolling passage and the other end thereof so as to constitute an unloaded return passage. The return pipe 44 is formed to be substantially gate-shaped and has a pair of leg portions 44b and 44b provided on the central portion 44a and both sides of the central portion 44a. The paired leg portions 44b and 44b are inserted into the loaded rolling passage at an interval of several pitches. The return pipe 44 is fixed to the nut member 42 by coupling device such as a bolt 45.

A ball rolling groove 41a which is semicircular in cross section and has a spiral constant lead therearound is formed in the screw shaft 41 by a grinding, rolling or like process. The nut member 42 has substantially a cylindrical shape and has a flange 46 at one end surface thereof for mounting the ball screw 40 to a machine or the like. The loaded rolling groove 42a which is semicircular in cross section and faces the ball rolling groove 41a of the screw shaft 41 is formed on the inner peripheral surface of the nut member 42. A flat surface portion 47 is formed on a partially flat chamfered upper surface of the nut member 42. The flat surface portion 47 has several return pipe fitting holes, into which the leg portions 44b and 44b of the return pipes 44 are inserted.

Then, when the AE sensor 1 of the present embodiment is installed to the LM system shown in FIG. 6(a), as the exterior side view is shown in FIG. 6(b), for example, if the screw shaft 41 rotatably supported by a base 49 is fixed to a table 51 through a bracket 50 with respect to the ball screw 40 rotated by a motor 48, the AE sensor 1 is mounted on a surface of the flange 46 perpendicular to the central axis of the ball screw 40.

Next, with reference to FIGS. 1, 2, 7, and 8(a), the operating state detection process in accordance with the present embodiment executed mainly by the signal processing unit 4 will be explained.

As shown in FIG. 7, when the operating state detection process in accordance with the present embodiment executed during the operation of the LM system to be diagnosed, first, an operating frequency of the LM system to be inspected is obtained by a known method or an input operation by the user (step S1), and at the same time, in the operating state detection process in accordance with the present embodiment, a generated frequency of a noise signal which can be generated by a device other than an LM system to be inspected (more specifically, a noise signal detected as the extended AE wave) is obtained by a known method or an input operation by the user (step S2).

Here, more specifically about the noise signal, for example, in the case where linear motion rolling guide units are operating in a manner such as an LM system including the movable block 21 (see FIG. 4 or 5) is operating near an LM system including the ball screw 40 (see FIG. 6), if the operating state detection process in accordance with the present embodiment is performed on the LM system including the movable block 21 only, an extended AE wave which is generated and transferred by and from the LM system including the ball screw 40 during its operation is treated as the noise signal in the operating state detection process in accordance with the present embodiment (see step S2).

After each frequency is obtained by the processes in the steps S1 and S2, a determination is made to see whether these frequencies are equal or not (step S3). If both frequencies are within a predetermined frequency range (step S3; =), which indicates that the operating state detection process in accordance with the present embodiment involving Fourier transform described later cannot distinguish between the two frequencies, the display unit 5 displays error information indicating that the operating state cannot be detected (step S17) and the operating state detection process in accordance with the present embodiment terminates.

On the contrary, as a determination in step S3, if both frequencies are different exceeding a predetermined frequency range (step S3; ≠), a threshold TH which has been experimentally set in advance as a criterion for determining whether the lubrication state of the LM system of the present embodiment corresponding to a parameter in accordance with the present invention is normal or not is obtained and stored in a memory (not shown) in the signal processing unit 4 (step S4), and a required initial setting process and the like are performed. Further, an extended AE wave is detected, which occurs due to an extended AE phenomenon which occurs during the operation of the LM system to be inspected in the AE sensor 1 (step S5). Then, the waveform shaping unit 2 performs a waveform process such as a waveform shaping process on the corresponding detection signal Sae (step S6), the envelope signal Sw is generated and outputted to the signal processing unit 4 through the A/D converter 3 as the digital envelope signal Sdw.

Then, a determination is made to see whether a trigger signal is generated in the signal processing unit 4 or not, which corresponds to a timing (e.g., a timing when the movable block 21 comes close to one end of the rail 20 for the LM system shown in FIG. 4) predetermined as a timing of obtaining the measured data (step S7, S7; No), or a timing when the trigger signal is generated (step S7, S7; Yes). Then, the digital envelope signal Sdw is fetched as the measured data Xi corresponding to one of the timing ti.

After the extended AE wave detection process (step S5) and the waveform shaping process (step S6), the process of obtaining as measured data is repeated for a required inspection time, and the measured data is stored in a memory (not shown) in the signal processing unit 4 as the digital envelope signal Sdw (step S8). Then, the parameter is calculated based on the stored measured data and stored in the memory (steps S9 and S10).

Next, with reference to FIG. 8(a), the parameter calculation process (step S9) will be described in detail, which is executed on the fetched measured data (ti, Xi) and includes the Fourier transform process.

In the step S9, first, if number of measured data (ti, Xi) corresponding to the inspection time is obtained (step S91), Fourier transform (i.e., more specifically, a so called power spectrum transform process) is performed on all the data (step S92) to calculate the transformed measured data (Fj, Yj) corresponding to the individual measured data (ti, Xi).

Then, the transformed measured data (Fm, Ym) having a maximum value of a frequency which is closest to an operating frequency (e.g., a passing frequency of the ball B) obtained in the process of the step S1 in the LM system is extracted from the transformed measured data (Fj, Yj) having data Yi which becomes a maximum value in the transformed measured data (Fj, Yj) (step S93).

Here, data Ym corresponding to the intensity of an extended AE wave in the extracted transformed measured data (Fm, Ym) is data indicating the intensity of an extended AE wave corresponding to an operating frequency of the LM system to be inspected. Therefore, all the data $Y2m$, $Y3m$, $Y4m$, ... in the transformed measured data ($F2m$, $Y2m$) ($F3m$, $Y3m$) ($F4m$, $Y4m$), ... corresponding to the harmonic content of the operating frequency is added to the data Ym to make a parameter P ($=Ym+Y2m+Y3m+Y4m+$ ...) in accordance with the present embodiment (step S94), and then, the process moves to step S10 shown in FIG. 7.

Then, when the calculation of the parameter P and its storage are completed, a confirmation is made to see whether the measurement terminates or not (step S11). If the measurement continues, the process returns to the step S7 and repeats the processes in the steps S7 to S11 for the next inspection time. On the contrary, if the measurement terminates (step S11; YES), the threshold TH (see the step 4) is read from a memory (not shown) in the signal processing unit 4 (step S12), and further, the read threshold TH is compared with a value of parameter P stored at that time (step S13).

Then, if the value of the parameter P is less than the threshold TH (step S14; less than threshold), the lubrication state at that time in the LM system to be inspected is determined to be normal (step S14), the display unit 5 is used to display a message to the effect (step S16), and then, a series of operating state detection process terminates.

On the contrary, as the determination in step S13, if the value of the parameter P is equal to or greater than the threshold TH (step S13; equal to or greater than threshold), the lubrication state at that time in the LM system is determined to be poor (step S15), the display unit 5 is used to display a message to the effect (step S16), and then, a series of operating state detection processes terminate.

It should be noted that above described series of operating state detection results are not only displayed but also stored in the memory in the signal processing unit 4 for statistical processing, and thereby a deterioration of the operating state can be detected to prevent a failure from occurring.

As described above, according to the operation of the state diagnosing apparatus S in accordance with the present embodiment, an extended AE wave generated by the operation of the LM system is detected and the parameter P is generated; then, if the value of parameter P is less than the threshold TH, the lubrication state in the LM system is determined to be normal; and thereby, it is possible to detect whether the lubrication state is normal or not, in real time while the LM system is operating, without disassembling the LM system and without being affected by a vibration caused by the operation of the LM system.

Accordingly, it is possible to predict failure occurrence in the LM system; to provide an improved maintenance to a user of the LM system; to provide longer lifetime thereof; and to provide a performance guarantee and an improved quality of a device or equipment manufactured using the LM system.

In addition, only data corresponding to an operating frequency of the LM system to be inspected is extracted from transformed measured data (fi, Yi) after Fourier transform; and thereby, required transformed measured data can be extracted by a simple configuration.

Further, the determined result is displayed by the display unit 5; and thereby, the user of the LM system to be inspected can immediately recognize the lubrication state in detail.

(III) Variation

Next, with reference to FIG. 8(b), a variation in accordance with the present invention will be described. It should be noted that the same step number in the flowchart shown in FIG. 8(b) is assigned to the same process as that in the flowchart shown in FIG. 8(a), and the detailed description is omitted.

According to the above described parameter calculation process in accordance with the present embodiment (see step S9 in FIG. 7 and FIG. 8(a)), the transformed measured data (Fm, Ym) having a maximum value of a frequency which is closest to an operating frequency obtained in the step S1 of FIG. 7 in the LM system is extracted from the transformed measured data (Fj, Yj) having data Yi which becomes a maximum value in the individual transformed measured data (Fj, Yj) in step S93. However, but the present invention is not limited to this, but may be configured such that, if there is a large difference between the operating frequency of the LM system to be inspected and the frequency of the noise signal (see step S2 in FIG. 7), more specifically, for example, if the frequency of the noise signal is several times higher than the operating frequency, as shown in step S100 of FIG. 8(b), all the transformed measured data (Fm, Ym) corresponding to a higher frequency than the operating frequency (the frequency of the noise signal is higher than the operating frequency) obtained in the step S1 of FIG. 7 in the LM system is removed from the transformed measured data (Fj, Yj) having data Yi which becomes a maximum value in the individual transformed measured data (Fj, Yj), and the rest is subjected to the subsequent parameter P calculation process (step S94).

It should be noted that if the frequency of the noise signal is several times lower than the operating frequency, as the process in step S100, all the transformed measured data (Fm, Ym) corresponding to a lower frequency than the operating frequency obtained in the step S1 of FIG. 7 in the LM system is removed from the transformed measured data (Fj, Yj) having data Yi which becomes a maximum value in the individual transformed measured data (Fj, Yj), and the rest is subjected to the subsequent parameter P calculation process (step S94).

Here, "if the frequency of the noise signal is several times lower than the operating frequency" refers to, specifically, for example, a case where linear motion rolling guide units are operating in a manner such as an LM system including a movable block 21 is operating near an LM system including a ball screw 40, and it can be considered that the operating state detection process in accordance with the present embodiment is performed on the LM system including the ball screw 40 only.

According to the variation described above, all the transformed measured data (Fm, Ym) corresponding to a frequency width equal to or greater than a frequency which is higher by a predetermined frequency width than the operating frequency of the LM system to be inspected or all the transformed measured data (Fm, Ym) corresponding to a frequency width equal to or less than a frequency which is lower by a predetermined frequency width than the operating frequency of the LM system to be inspected is removed from the transformed measured data (Fm, Ym) after Fourier transform and remaining transformed measured data (Fm, Ym) is used to calculate the parameter P. Thereby, required transformed measured data (Fm, Ym) can be extracted by a simpler configuration.

Further, a program corresponding to the flowcharts shown in FIGS. 7 and 8 is stored in a flexible disk, a hard disk, or other information recording medium; or the program is obtained through the Internet or other network and stored; and the program is read and executed by a general purpose microcomputer so as to cause the microcomputer to function as the signal processing unit 4 in accordance with the present embodiment. In this case, the AE sensor 1, the waveform shaping unit 2, and the A/D converter 3 are configured by external devices with respect to the microcomputer.

Further, according to the above described embodiment and variation, the state detecting apparatus S having a configuration shown in FIG. 2 is described as a single device configuration. This embodiment can be applied to a case where, for example, the state diagnosing apparatus S is carried within a site such as factory in which the LM system to be diagnosed is installed and used, and on the site, the state detecting apparatus S is used to detect and diagnose the operating state of the LM system.

Further, the state detecting apparatus S in accordance with the embodiment and variation can be applied to not only the above described case but also a case where, the state diagnosing apparatus S is always available on site such as in a factory in which the LM system to be diagnosed is installed and used, and a diagnosing person operates the state diagnosing apparatus S from an isolated place by remote control through a telephone line or the like to detect and diagnose the operating state of the LM system.

Further, the present invention can be applied to a case where, the state diagnosing apparatus S is always available on site such as in a factory in which the LM system to be diagnosed is installed and used and the state diagnosing apparatus S is used to automatically detect and diagnose the operating state of the LM system to be diagnosed and at the same time, the detected result is transmitted to some other place so as to be stored therein and a cumulative failure diagnosis is performed based on the cumulatively detected result.

Furthermore, in the above described embodiment, description is given to a configuration in which the state detecting apparatus S is configured of one AE sensor 1, one waveform shaping unit 2, one A/D converter 3, one signal processing unit 4, and one display unit 5 respectively. However, another configuration may also be allowed, in which a detection signal Sae from a plurality of AE sensors 1 is inputted to one waveform shaping unit 2 through a switching circuit; a detection signal Sae from a plurality of AE sensors is processed by one waveform shaping unit 2, one A/D converter 3, one signal processing unit 4, and one display unit 5 respectively. In this case, the timing of executing a detection process using the waveform shaping unit 2, the A/D converter 3, the signal processing unit 4, and the display unit 5 needs to be synchronized with the timing of fetching the detection signal Sae from the AE sensor 1.

INDUSTRIAL APPLICABILITY

As described above, the present invention can be applied to a field of determining the operating state of the LM system and in particular, if the present invention is applied to a field of determining the operating state of the linear motion system such as an LM guide and a ball spline, remarkable effects can be obtained.

The invention claimed is:
1. A state detecting apparatus for detecting a current operating state of a linear motion rolling guide unit, the state detecting apparatus comprising:
   an operating frequency obtain unit for obtaining an operating frequency of the linear motion rolling guide unit to be inspected;
   a generated frequency of a noise signal obtain unit for obtaining a generated frequency of a noise signal which can be generated by a device other than the linear motion rolling guide unit to be inspected that is operating near the linear motion rolling guide unit;
   a determination unit for determination of whether the operating frequency and the generated frequency of a noise signal are equal or not;
   a detection unit for detecting a wave motion which is elastically generated due to at least one of collision which occurs between a rolling surface contained in the linear motion rolling guide unit and a rolling body when a plurality of rolling bodies contained in the linear motion rolling guide unit are revolving in a circulation portion while spinning themselves; slip in a contact portion between the rolling surface and the rolling body; collision between the rolling bodies themselves, slip in a contact portion of the rolling bodies themselves; and crack which occurs in at least one of the rolling body and the rolling surface; and for generating an electrical detection signal corresponding to the detected wave motion;

a transform device for configuring measured data group using individual measured data obtained by sampling the generated detection signal, performing Fourier transform on the measured data group, and generating a transformed measured value, respectively, an extraction device for extracting only the transformed measured value corresponding to a frequency corresponding to an operating frequency of the linear motion rolling guide unit from the generated transformed measured values after performing the Fourier transform;

a generation device for generating a parameter indicating an intensity of the wave motion by adding data corresponding to an intensity of the transformed measure value to data corresponding to harmonic content of the operating frequency based on the extracted measured value as extracted; and a determination device for comparing a value of the generated parameter and a threshold predetermined for the parameter and determining whether the operating state is normal or not.

2. The state detecting apparatus according to claim 1, wherein the extraction device outputs, to the generation device, the transformed measured value which is left by removing the transformed measured value corresponding to a frequency width equal to or greater than a frequency which is higher by a predetermined frequency width than an operating frequency of the linear motion rolling guide unit from the generated transformed measured values.

3. The state detecting apparatus according to claim 2, wherein the determination device determines that the operating state is a good lubrication state if a value of the generated parameter is less than the threshold.

4. A non-transitory computer readable medium containing a state detecting program, which when operated on a computer, causing a computer to function as the state detecting apparatus according to claim 2.

5. The state detecting apparatus according to claim 1, wherein the extraction device outputs, to the generation device, the transformed measured value which is left by removing the transformed measured value corresponding to a frequency width equal to or less than a frequency which is lower by a predetermined frequency width than an operating frequency of the linear motion rolling guide unit from the generated transformed measured values.

6. The state detecting apparatus according to claim 5, wherein the determination device determines that the operating state is a good lubrication state if a value of the generated parameter is less than the threshold.

7. The state detecting apparatus according to claim 1, wherein the determination device determines that the operating state is a good lubrication state if a value of the generated parameter is less than the threshold.

8. A non-transitory computer readable medium containing a state detecting program, which when operated on a computer, causing a computer to function as the state detecting apparatus according to claim 7.

9. A non-transitory computer readable medium containing a state detecting program, which when operated on a computer, causing a computer to function as the state detecting apparatus according to claim 1.

10. A non-transitory information recording medium, wherein the state detecting program according to claim 9 is computer-readably recorded by the computer.

11. A state detecting method for detecting a current operating state of a linear motion rolling guide unit, the state detecting method comprising:

an operating frequency obtain step for obtaining an operating frequency of the linear motion rolling guide unit to be inspected;

a generated frequency of a noise signal obtain step for obtaining a generated frequency of a noise signal which can be generated by a device other than the linear motion rolling guide unit to be inspected that is operating near the linear motion rolling guide unit;

a determination step, using a computer, for determination of whether the operating frequency and the generated frequency of a noise signal are equal or not;

a detection step for detecting a wave motion which is elastically generated due to at least one of collision which occurs between a rolling surface contained in the linear motion rolling guide unit and a rolling body when a plurality of rolling bodies contained in the linear motion rolling guide unit are revolving in a circulation portion while spinning themselves; slip in a contact portion between the rolling surface and the rolling body; collision between the rolling bodies themselves, slip in a contact portion of the rolling bodies themselves; and crack which occurs in at least one of the rolling body and the rolling surface; and for generating an electrical detection signal corresponding to the detected wave motion;

a transforming step for configuring measured data group using individual measured data obtained by sampling the generated detection signal, performing Fourier transform on the measured data group, and generating a transformed measured value, respectively, an extraction step for extracting only the transformed measured value corresponding to a frequency corresponding to an operating frequency of the linear motion rolling guide unit from the generated transformed measured values after performing the Fourier transform;

a generation step for generating a parameter indicating an intensity of the wave motion by adding data corresponding to an intensity of the transformed measured value to data corresponding to harmonic content of the operating frequency based on the extracted measured value as extracted; and a determination step for comparing a value of the generated parameter and a threshold predetermined for the parameter, and determining whether the operating state is normal or not.

12. The state detecting method according to claim 11, wherein the determination step for comparing the value determines that the operating state is a good lubrication state if a value of the generated parameter is less than the threshold.

* * * * *